April 17, 1951  A. E. JURS, JR  2,549,689
FLUID OPERATED VALVE
Filed Jan. 7, 1946
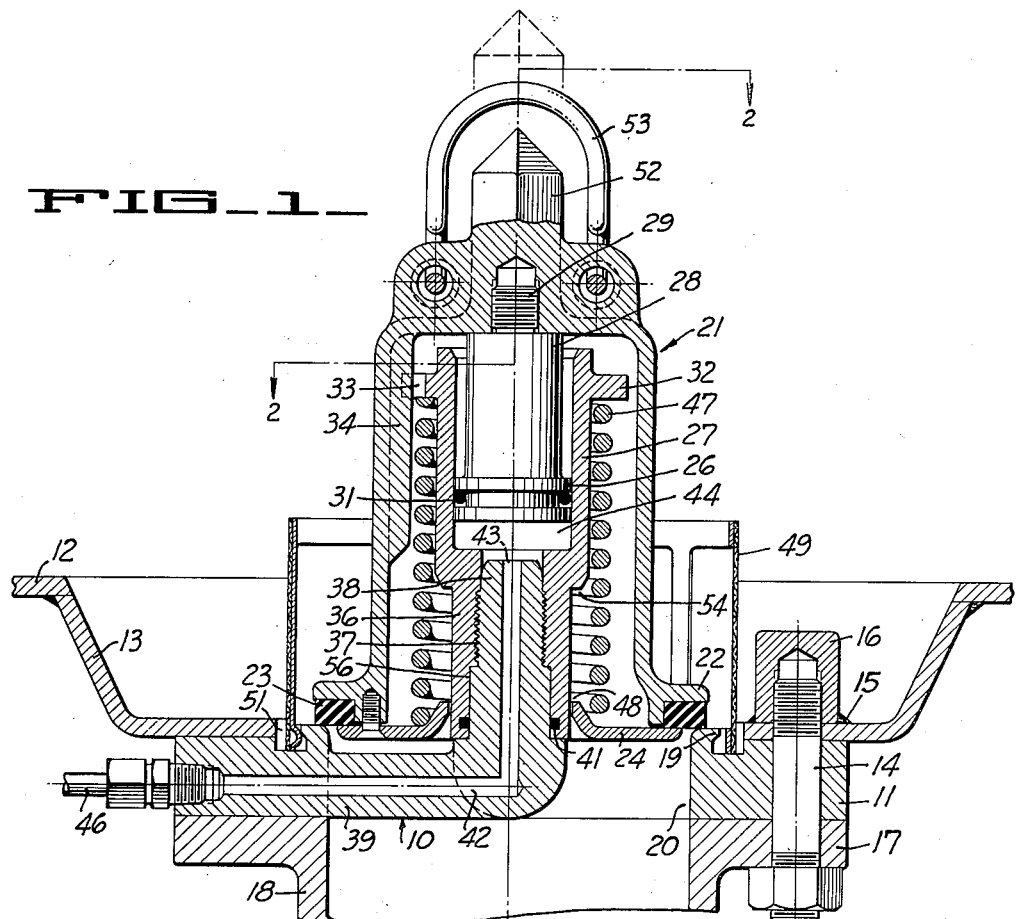
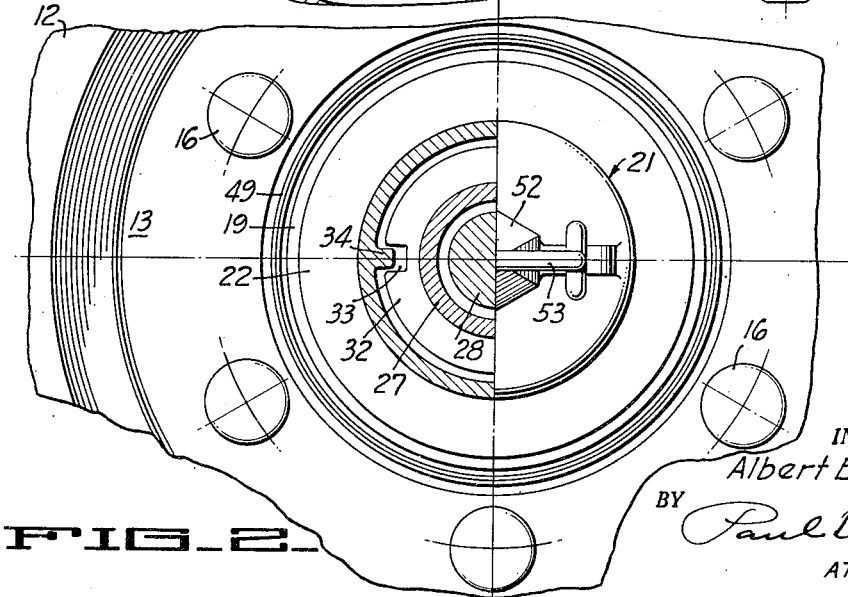
INVENTOR.
Albert E. Jurs Jr.
BY
Paul O. Flehr
ATTORNEY Patented Apr. 17, 1951

2,549,689

UNITED STATES PATENT OFFICE 2,549,689

FLUID OPERATED VALVE

Albert E. Jurs, Jr., Berkeley, Calif., assignor to Shand & Jurs Company, Berkeley, Calif., a partnership Application January 7, 1946, Serial No. 639,566

9 Claims. (Cl. 137—21)

This invention relates generally to valves of the type adapted for fluid pressure operation, and particularly valves suitable for installation on tanks or tank compartments for controlling the discharge of various liquids.

In the dispensing of various liquids from tanks it is frequently desirable to install a valve in the bottom wall of the tank, and to effect opening and closing of the same from a remote point. For example as shown in Jurs 1,976,445, it has been common practice to install fluid operated valves in the bottom wall of motor truck tanks to enable an operator to control the dispensing of gasoline or like petroleum products from a convenient valve control station, usually located at the side or rear of the truck. The repair or replacement of parts of such valve units involves considerable difficulty in that one must detach certain parts exterior of the tank, in order to remove the principal working parts. This not only requires considerable labor for disconnecting exterior pipe connections and the like, but in addition it involves fire hazards which cannot be avoided even though care is taken to drain out the tank or compartment involved.

In general it is an object of the present invention to provide an improved valve of the above character in which the principal working parts can be readily removed or applied as a unit without effecting removal of the valve body and stationary seat.

Another object of the invention is to provide a remote operated tank valve which has its principal working parts removable with respect to the valve body through the top of the tank.

Another object of the invention is to provide a novel construction and combination of parts enabling attainment of the above object, and which in general provides a valve which can be readily manufactured, and which will be reliable in operation with a minimum amount of servicing.

Additional objects of the invention will appear from the following description in which the preferred embodiment has been set forth in detail in conjunction with the accompanying drawing.

Referring to the drawing:

Figure 1 is a side elevational view in section illustrating a valve unit incorporating the invention.

Figure 2 is a cross-sectional view taken along the line 2—2 of Figure 1.

The valve as illustrated in the drawing consists of a body 10 which is formed to provide the flange 11. To facilitate installation in the bottom wall 12 of the tank it is desirable to provide this bottom wall with a shallow pan 13, to which flange 11 is secured as by means of bolts 14. To insure against leakage the nuts 16 engaging bolts 14 are in the form of caps and are provided with seal welds 15 to the pan 13. The exterior face of the body 10 can be directly bolted to the coupling flange 17 of the dispensing pipe 18.

An annular valve seat 19 is formed upon the upper face of the body, and this seat surrounds the body opening 20, through which liquid may flow. The valve member 21 which cooperates with seat 19 is bonnet-like or bell-shaped, and its lower end is provided with a flange 22 serving as a mounting for the seat ring 23, which may be of suitable synthetic rubber or like composition. The inner peripheral edge of seat ring 23 is clamped and retained in position by disc or plate 24.

Within the valve member 21 fluid operated means is provided for moving the valve member between open and closed positions. This means comprises two parts, namely a piston 26 fitted within a cylinder 27. The piston is carried at the lower end of a cylindrical extension 28, which in turn is attached to the valve member 21 by a threaded stud 29. Leakage past the piston can be prevented by suitable sealing means, such as an O-ring 31 formed of suitable resilient material. The upper portion of the cylinder 27 is provided with a flange or annulus 32 which is shown slotted at 33 to slidably accommodate the rib 34. Because the rib 34 is formed on the inner wall of the valve member 21, a non-rotatable connection is provided between the valve member and the cylinder, while at the same time the valve member may move relative to the cylinder in a vertical direction.

The lower end of the cylinder 27 is formed with a sleeve-like extension 36 which has a threaded connection 37 to the stud 38. This stud is fixed to the body 10, as by forming it integral with the radially extending arm 39. Suitable means such as a seal ring 41 can be provided to prevent leakage between the stud and the sleeve extension 36. The body and stud 38 are provided with passages or ducts 42, 43 to enable application of fluid under pressure, such as either air or liquid, into the space 44 beneath the piston 26. Pipe 46 shown connected to duct 42 may lead to some suitable source of fluid pressure, such as a hydraulic operator, a liquid pressure pump, or a source of air or other gas under pressure.

Compression spring 47 is provided for normally urging the valve member 21 towards closed position. The upper end of this spring is shown seated upon flange 32, and the lower end seats upon the disc 24. Disc 24 has a central opening 48 to accommodate the extension sleeve 36, thus aiding in guiding the valve member in its operating movements.

In some instances it is desirable to provide a suitable cylindrical shaped screen 49, the lower end of which may rest within an annular recess 51 provided in the upper face of the body about the valve seat 19.

The upper end of the valve member 21 is formed to facilitate application of a suitable tool which may be extended down from the top of the tank. Thus a hexagonal portion 52 is formed upon the upper end of the valve member, and in addition a lifting bail 53 is provided.

Operation of the valve unit described above can be explained as follows: When installed in a tank or tank compartment as illustrated compression spring 47 normally urges the valve member and the seat ring 23 towards closed position against the stationary valve seat 19. To open the valve a liquid or pneumatic pressure is applied from pipe 46 through ducts 42, 43 into the chamber 44 below the piston 26. The piston is thereby displaced upwardly to elevate the valve member 21 to full open position. When in full open position the inner periphery of plate 24 contacts the annular shoulder 54 at the lower end of the cylinder 27. When the fluid pressure in chamber 44 is relieved, the valve member returns to closed position under the urge of gravity and the pressure of spring 47. Assuming that it is desired to make repairs or replacements of certain of the working parts, the operator extends a suitable tool down through the top of the tank and engages it with the hexagonal stud 52. Turning movement thus applied to the valve member 21 turns the cylinder 27 and the extension 36, to thereby unscrew extension 36 from the stud 38. After complete disengagement of this threaded connection the operator can engage a tool with bail 53 and lift the valve assembly upwardly through the top of the tank. To re-install the assembly thus removed the operator lowers the valve member and associated parts down into the tank and the lower unthreaded portion 56 of the sleeve 36 is permitted to slide over the upper end of the stud 38. This temporary slip engagement retains the valve member in a general vertical position ready to be turned to establish final permanent attachment to the body. The operator then engages the turning tool with the hexagonal stud 52, and the assembly is turned until the extension 36 is firmly engaged with the stud 38.

It will be evident that the construction described above is an improvement over valves which have been employed for tanks in the past. All of the working parts with the exception of the body and its associated stationary seat 19, are removable and can be reapplied as a unit, leaving the body attached to the wall of the tank and without disturbing the connections to the body. Thus the repair or servicing of my valve is made a simple operation, which if necessary can be carried out under field conditions.

I claim:

1. In a fluid operated valve adapted for installation in the wall of a tank, a body member adapted to be fixed to said wall, a valve seat formed on one face of the body, the body having an opening through the seat and through which liquid may flow from the tank, a movable valve member cooperating with the seat, means including relatively movable parts for effecting movement of the valve member between open and closed positions responsive to application of fluid pressure, one of said parts being rigidly attached to the valve member and the other of said parts having a non-rotatable engagement with the valve member, and means forming a detachable engagement between said other part and the body, the valve member being formed for engagement with a tool to enable the valve member together with said relatively movable parts to be removed or applied to the body as a unit.

2. In a fluid operated valve adapted for installation in the bottom wall of a tank, a body member adapted to be fixed to said bottom wall, a valve seat formed on the upper face of the body, the body having an opening through the seat and through which liquid may flow from the tank, a vertically movable valve member cooperating with the seat, means including interfitting piston and cylinder parts for effecting movement of the valve member between open and closed positions responsive to application of fluid pressure, one of said parts being rigidly attached to the valve member and the other of said parts having non-rotatable engagement with the valve member, means forming a single detachable threaded engagement between said other part and the body, the valve member being formed for engagement with a turning tool inserted downwardly into the tank from the top thereof thereby enabling the valve member together with the piston and cylinder parts to be removed or applied to the body as a unit.

3. In a fluid operated valve adapted for installation in the bottom wall of a tank, a body adapted to be fixed to said bottom wall, a valve seat formed on the upper face of the body, the body having an opening through the seat and through which liquid may flow from the tank, a vertically movable bonnet-like valve member cooperating with the seat, means including interfitting piston and cylinder parts disposed axially within the bonnet-like valve member and serving to effect movement of the valve member between open and closed positions responsive to application of fluid pressure, one of said parts being rigidly attached to the valve member and the other of said parts having a non-rotatable attachment with the valve member, and means forming a single detachable threaded engagement between said other part and the body, the valve member being formed for engagement with a turning tool inserted downwardly into the tank from the top thereof thereby enabling the valve member together with the piston and cylinder parts to be removed or applied to the body as a unit.

4. In a fluid operated valve adapted for installation in the bottom wall of a tank, a body adapted to be fixed to said bottom wall, a valve seat formed on the upper face of the body, the body having an opening through the seat and through which liquid may flow from the tank, a vertically movable valve member cooperating with the seat, means including interfitting piston and cylinder parts for effecting movement of the valve member between open and closed positions responsive to the application of fluid pressure, one of said parts being rigidly attached to the valve member and the other of said parts having a non-rotatable engagement with the valve member, a threaded member attached to the valve body and disposed axially of the seat, and means attached to said other part for effecting a threaded engagement with said member, the valve member being formed for engagement with a turning tool inserted downwardly into the tank from the top thereof hereby enabling the valve member together with the piston and cylinder parts to be removed or applied to the body as a unit.

5. In a fluid operated valve adapted for installation in the bottom wall of a tank, a body adapted to be fixed to the bottom wall, an annular valve seat formed on the upper face of the body, the body having an opening through the seat and through which liquid may flow from the tank, a vertically movable bonnet-like valve member cooperating with the seat, means including interfitting piston and cylinder parts disposed within the bonnet-like valve member and serving to effect movement of the valve member between open and closed positions responsive to application of fluid pressure, one of said parts being rigidly attached to the valve member and the other of said parts having a non-rotatable attachment with the valve member, a threaded stud fixed to the body and extending axially with respect to the valve seat and means formed on said other part for threaded engagement with said stud, the valve member being formed for engagement with a turning tool inserted downwardly into the tank from the top thereof thereby enabling the valve member together with the piston and cylinder parts to be removed or applied to the bottom as a unit by effecting threaded engagement or disengagement with said stud.

6. In a fluid operated valve adapted for installation in the bottom wall of a tank, a body adapted to be fixed to said bottom wall, an annular valve seat formed on the upper face of the body, the body having an opening through the seat and through which liquid may flow from the tank, a vertically movable bonnet-like valve member cooperating with the seat, interfitting piston and cylinder parts disposed within the bonnet-like valve member, the piston being attached to the valve member and the cylinder part having a non-rotatable engagement with the valve member, a vertically extending stud carried by the body centrally of the valve seat, an extension on the lower end of the cylinder part having a threaded engagement with the stud, the stud being provided with a duct to enable application of fluid to the cylinder for operation of the valve member between open and closed positions, the upper end of the valve member being formed for engagement with a turning tool inserted downwardly into the tank from the top thereof thereby enabling the valve member together with the piston and cylinder parts to be removed or applied to the body as a unit, by effecting threaded engagement or disengagement with said stud.

7. In a fluid operated valve adapted for installation in the wall of a tank, a body member adapted to be fixed to said wall, a valve seat formed on one face of the body, the body having an opening through the seat and through which liquid may flow from the tank, a movable valve member cooperating with the seat, means including relatively movable piston and cylinder parts for effecting movement of the valve member between open and closed positions responsive to application of fluid pressure, one of said parts being attached to the movable valve member and the other of said parts having a non-rotatable engagement with the movable valve member, and means forming a detachable engagement between said other part and the body, the valve member being formed for engagement with a tool to enable the valve member together with said piston and cylinder parts to be removed or applied to the body as a unit.

8. In a fluid operated valve adapted for installation in the wall of a tank, a body member adapted to be fixed to said wall, a valve seat formed on one face of the body, the body having an opening through the seat and through which liquid may flow from the tank, a movable valve part cooperating with the seat, means including relatively movable parts providing a fluid chamber between them and serving to effect movement of the valve part between open and closed positions responsive to application of fluid pressure to said chamber, one of said last named parts being attached to the valve part and the other of said parts being non-rotatable with respect to the valve part, and means forming a detachable engagement between said other part and the body, said valve part being formed for engagement with a tool from within the tank to enable the valve part together with said relatively movable parts to be removed or applied to the body as a unit.

9. A valve as in claim 8 together with a spring acting to urge the movable valve part toward the valve seat, said spring forming a part of the removable unit.

ALBERT E. JURS, Jr.

REFERENCES CITED

The following references are of record in the file of this patent:

UNITED STATES PATENTS

| Number | Name | Date |
| --- | --- | --- |
| 1,604,428 | Veeder | Oct. 26, 1926 |
| 1,758,644 | Betts | May 13, 1930 |
| 1,943,843 | Shand | July 16, 1934 |
| 1,976,445 | Jurs | Oct. 9, 1934 |
| 2,237,377 | Thevaits | Apr. 8, 1941 |
| 2,293,269 | Rufus | Aug. 18, 1942 |